June 26, 1928.  1,674,723
T. HODGES
CARBURETING SYSTEM
Filed Nov. 23, 1926
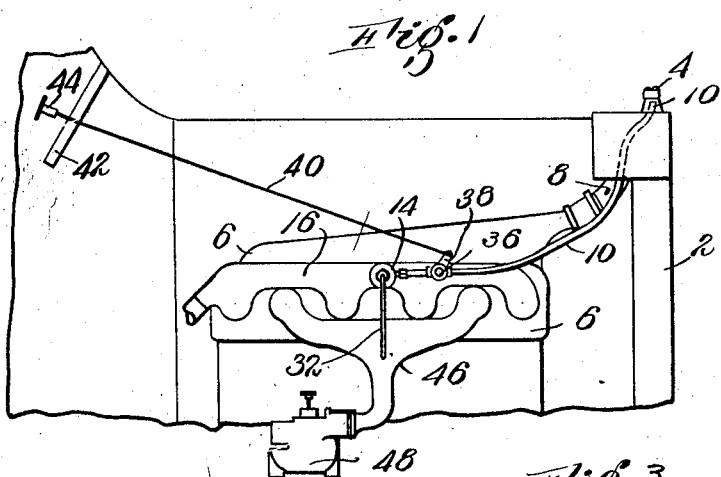
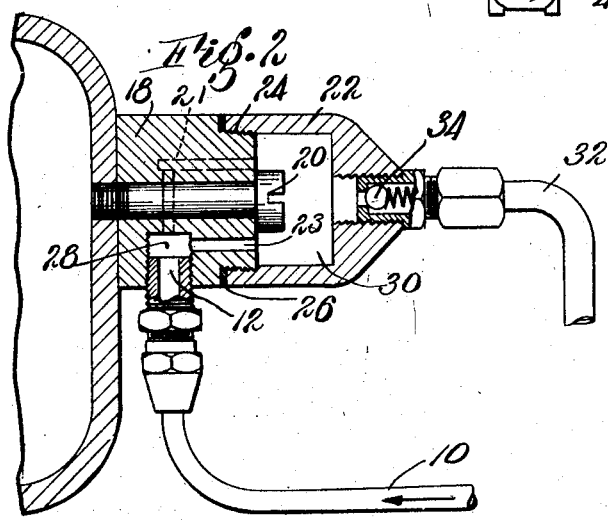
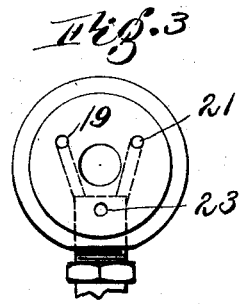
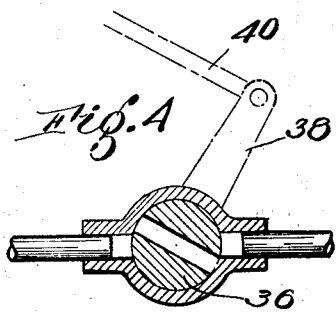
Inventor
Tom Hodges.
By Roberts Cushman + Woodberry
Attys.

Patented June 26, 1928.

1,674,723

UNITED STATES PATENT OFFICE.

TOM HODGES, OF SWAMPSCOTT, MASSACHUSETTS, ASSIGNOR OF ONE-HALF TO ALBERT W. KAFFENBURGH, JR., OF BOSTON, MASSACHUSETTS.

CARBURETING SYSTEM.

Application filed November 23, 1926. Serial No. 150,339.

The present invention relates to a carbureting system, and more particularly to a system adapted for the removal of carbon from the cylinders of an internal combustion engine and for preventing the formation of carbon therein during normal operation.

One of the objects of my invention is to provide a novel carbureting system or method for forming a combustible fuel mixture whereby carbon apparently may be prevented from depositing or forming upon the interior surfaces of an internal combustion engine, such as cylinder walls and the piston heads, for example, and whereby substantially complete combustion apparently may be attained.

Another object of the invention is to provide, in connection with an internal combustion engine, means whereby water or water-vapor may be superheated or heated to a temperature above its boiling point under the existing pressure, and injected into the cylinders of an internal combustion engine with the fuel mixture without permitting condensation of the water-vapor to take place.

A further object of the invention is to provide means whereby water or water-vapor may be withdrawn from the radiator of an automobile and heated to a temperature above its boiling point and thereafter passed in regulated amounts to the carbureted motor fuel between the carburetor and engine, whereby a substantially homogeneous combustible mixture of carbureted motor fuel is provided and whereby the water-vapor is made available in each of the cylinders of the engine with the following apparent, advantageous results: the removal of deposited carbon, the prevention of the deposition of carbon, and in addition an increase in the motive power obtained from the fuel.

With these and other objects in view, the invention comprises the various features which will be hereinafter more fully described and particularly defined in the claims.

One system which has been experimented with in connection with automobile engines is to inject water directly into the cylinders of the engine in order to remove the deposited carbon. This method apparently results in the removal of some carbon, although the action is apparently entirely physical, some of the carbon being loosened through the difference in the rate of expansion of the carbon and the cylinder walls. This system is entirely unsatisfactory because the water injected into the engine causes local cooling and contraction of the metal surfaces with which it contacts and moreover results in incomplete combustion of the motor fuel. Moreover the water does not react with the carbon because the temperature is not sufficiently high under these conditions.

Another system which has been used involves withdrawing water-vapor from the radiator of an automobile and passing it directly into the carburetor to be mixed with the gasoline-air mixture, from which it passes to the intake manifold of the engine. It has been found, however, that a large proportion of the water-vapor passed to the carburetor condenses therein and eventually causes clogging of the carburetor and produces unsatisfactory operation thereof in a short interval of time.

As the result of a large number of experiments I have found that by withdrawing the aqueous fluid, such as water of water-vapor from the radiator of an automobile and passing it through a heating device which heats the water or water-vapor to a temperature above its boiling or vaporizing point and then passing the heated water-vapor directly to the inlet manifold at a point between the carburetor and the engine, the carbon is apparently rapidly removed from the cylinder walls and other portions of the engine. During the combustion of the motor fuel moreover the presence of the heated water-vapor serves apparently to prevent formation or deposition of carbon on the metal surfaces in the engine, and serves also to increase the power obtained from the motor fuel.

The various features of the invention are illustrated in their preferred form in the accompanying drawings, in which:

Fig. 1 is a view in perspective showing a portion of the forward end of an automobile to which my invention in applied;

Fig. 2 is a detailed view in section showing the heater or stove by means of which water or water-vapor from the radiator is heated;

Fig. 3 is a detail view showing the base of the heating stove; and

Fig. 4 is a detailed sectional view of the regulating means employed for regulating the amount of water or water-vapor passing to the stove and engine, the regulating means being connected to and controlled from the dashboard of the automobile.

Referring more in detail to the drawings, the numeral 2 indicates a radiator of the usual form having a radiator cap 4, the radiator being connected to the water jackets of engine 6 by the usual hose connection 8. Within the radiator and located preferably immediately below the cap 4 is one end of a pipe 10, which preferably extends upwardly above the normal water level in the radiator or if desired it may extend just above the opening of the overflow pipe, and extends downwardly out of the radiator, as indicated in the drawing to the inlet opening 12 of a heater or stove 14 which is attached by suitable means to the exhaust manifold 16 of the internal combustion engine.

The stove or heater 14 is preferably made in two parts, a base portion 18, which is preferably of brass or other highly conducting metal and which may be secured to the manifold 16 by means of a bolt or set screw 20, and a hollow cap 22, adapted to be connected to the base, which is preferably connected thereto by means of a screw-threaded connection 24, the cap being screwed into place so as to abut the shoulder 26 on the base member 18. In the base member 18 is an opening 28 to which the pipe 10 is connected, and extending through the base member 18 are a number of openings or passageways 19, 21 and 23, which lead from the inlet opening 28 to the hollow portion or chamber 30 of the cap 22. The chamber 30 is of sufficient capacity so that any unvaporized water passing thereto from the pipe 10 and passageways 19, 21 and 23 will remain in the chamber instead of passing into the pipe 32 at the top of the chamber or cap.

In passing from the chamber 30 to the pipe 32 the water-vapor preferably passes through a spring-pressed valve 34 which may be of any suitable form, such as a ball valve, so as to permit passage of water-vapor only in one direction. By this means if the pressure in the pipe 32 should become greater than that in the chamber 30 the valve would close, thus preventing further passage until the proper reduced pressure is attained. The feed of water or water-vapor passing through the pipe 10 to the heater 14 is preferably controlled by suitable regulating means such as a valve 36 by means of which the rate of feed to the heater and to the engine may be adjusted in accordance with the speed or vacuum of the engine and in accordance with its temperature. If the temperature of the engine is low, as in heating up for instance, the rate of feed of water or water-vapor should be low, or if desired, the valve may be entirely closed. If the engine is operating at high speed it will be necessary to open the valve more to permit the desired amount of water-vapor to pass through.

The valve 36 is preferably connected through levers 38 and 40 to the dash board 42 of the automobile, a handle 44 being attached to the rod 40 permitting the operator to adjust the valve while the automobile is in operation. The valve 36 is preferably arranged, as shown more particularly in Fig. 4, so that by turning the lever 38 through a quarter of a turn the valve may be completely opened or closed.

After the water-vapor has passed through the heater 14 and out through the valve 34 it passes into the pipe 32 which leads to the intake manifold 46 at a point between the carburetor 48 and the engine 6. At this point the water-vapor mixes with the gasoline-air mixture or other fuel mixture produced by the carburetor which passes into the engine cylinders in the usual manner and is ignited or exploded.

In the operation of the device, the valve 36 is preferably in the closed position while the engine is being started, and is permitted to remain closed until the engine heats up to a suitable temperature, with the apparent advantageous result that the water or water-vapor passed thereto will react with any carbon separated out in the gases or which is deposited on the cylinder walls or on the piston heads of the engine. After the engine has been run a sufficient time so that the exhaust manifold and the stove 14 are heated to a suitable temperature above the boiling point of water, the valve 36 is opened a sufficient amount to admit water or water-vapor from the radiator 2 through the pipe 10 to the inlet 12 of the heater 14, the water or water-vapor being heated in passing therethrough to a temperature at which it will apparently react with the carbon in the engine presumably to produce gaseous products, which will pass with the exhaust gases out of the engine.

As the pressure in the inlet manifold is a reduced pressure or below atmospheric pressure, there is no opportunity or tendency for the condensation of water-vapor to take place and in passing to the engine the water-vapor becomes substantially homogeneously mixed with the fuel mixture.

While I prefer to withdraw only water-vapor from the radiator which with the arrangement which has been described can only occur ordinarily after the engine has become heated sufficiently so that the water in the radiator has been raised to a temperature at which the vapor tension is high enough for substantial quantities of water-vapor to come off, I may draw off from the radiator only water or, if desired, a mixture of water and water-vapor may be drawn off, which in the heater will become entirely vaporized. If it is desired to withdraw only water from the radiator a branch pipe may be employed, the opening in the pipe 10 below the radiator cap being closed; the branch pipe or auxiliary pipe may be connected to the pipe 10 and may be provided with an opening below the surface of the water in the radiator. By this means a larger quantity of water-vapor may be supplied to the intake manifold between the carburetor and the engine than could be supplied by drawing off water-vapor alone from the radiator. Thus in cases where the engine becomes greatly overheated, as in hill climbing, for example, the deposition of carbon, which under such circumstances would be large, may be overcome by supplying water instead of water-vapor to the heater, whereby a larger proportion of water-vapor is supplied to the fuel mixture than would be possible through drawing off water-vapor alone from the radiator. In order to make up for loss of water from the radiator an auxiliary tank might be provided for supplying water thereto, particularly under conditions in which water would be withdrawn therefrom at a rapid rate, and automatic might be provided, if desired, for maintaining the water in the radiator up to a predetermined level, although for ordinary running such feeding means are unnecessary, as the rate of withdrawal of water-vapor from the radiator is comparatively slow.

While I have described my preferred arrangement or mode of carrying out my invention, it is to be understood that various changes or modifications may be made therein, as will be apparent to those skilled in the art, without departing from the spirit or scope of my invention as defined in the claims. By the term aqueous fluid as employed in the claims I mean to include liquid water, or water-vapor or a mixture of both.

I claim:

1. A heater adapted to be fastened to the exhaust manifold of an internal combustion engine, which comprises a substantially solid base portion, means for fastening said base portion to the exhaust manifold so as to conduct heat to said base portion, a cap member adapted to be connected to said base portion by a screw thread connection, said cap member having a chamber, means for connecting pipe to the lower side of said base portion, a series of small passageways in said base portion leading from the point of connection with said pipe to said chamber, and an exit pipe connected to said cap member.

2. A heater adapted for the heating of water to be passed into an internal combustion engine, which comprises a base portion adapted to be connected to the exhaust manifold of an engine, a hollow cap member connected to the base portion, said hollow cap member and said base portion together forming a chamber, a passageway in said base portion leading into said chamber, and a passageway from said chamber through the top of the cap member having a valve therein permitting exit of gases but preventing entrance therethrough.

Signed by me at Boston, Massachusetts this 8th day of November 1926.

TOM HODGES.